Dec. 29, 1942.  M. C. TATE  2,306,917
LOAD WEIGHING AND INDICATING SYSTEM
Original Filed Jan. 27, 1936
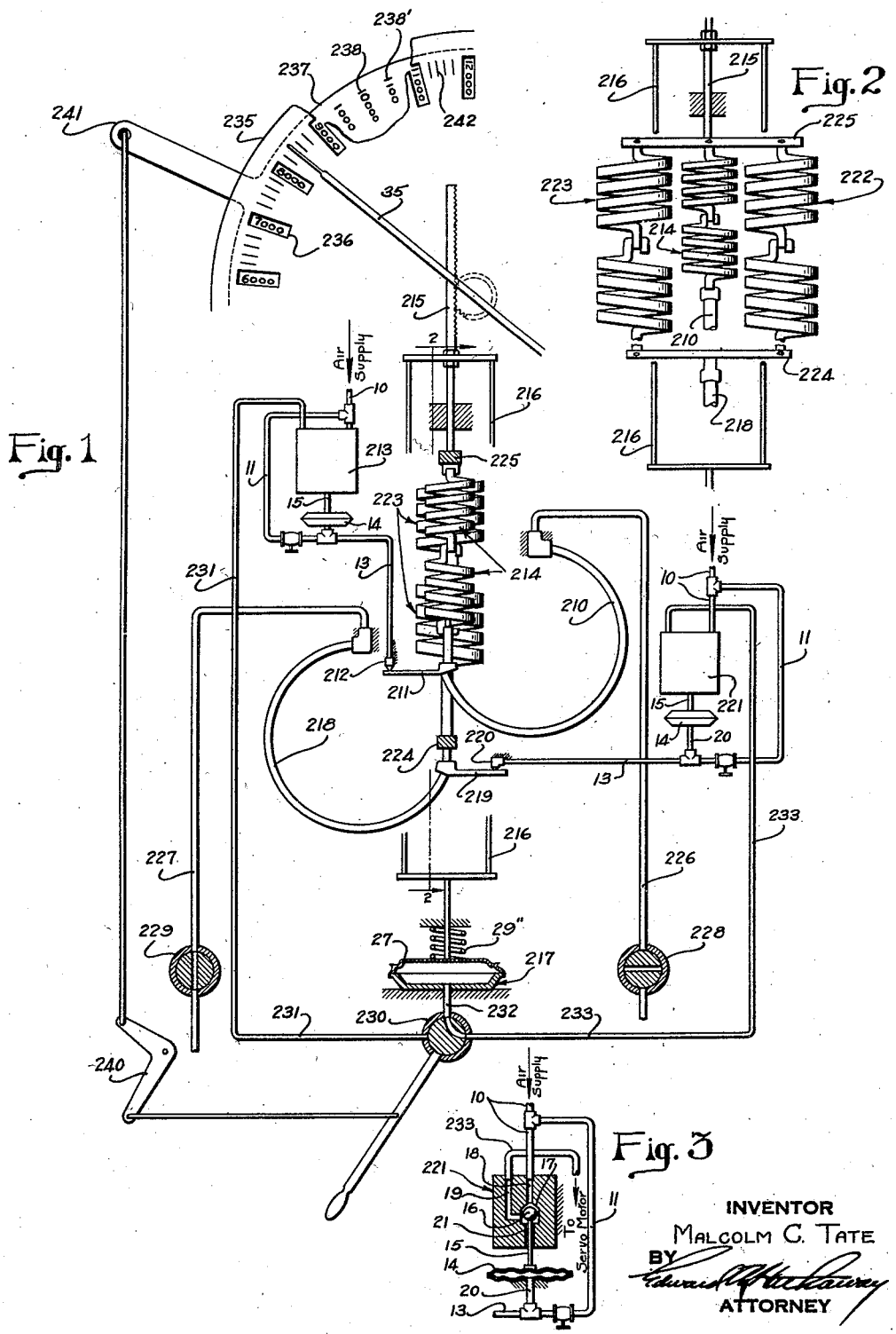
INVENTOR
MALCOLM C. TATE
BY
ATTORNEY Patented Dec. 29, 1942

2,306,917

UNITED STATES PATENT OFFICE 2,306,917

LOAD WEIGHING AND INDICATING SYSTEM

Malcolm C. Tate, Stamford, Conn., assignor, by mesne assignments, to The Baldwin Locomotive Works, a corporation of Pennsylvania Original application January 27, 1936, Serial No. 61,029. Divided and this application December 29, 1939, Serial No. 311,621

19 Claims. (Cl. 73—109)

This invention relates generally to a load weighing apparatus and more particularly to an improved multi-load range load weighing and indicating apparatus and system for materials testing machines. This application is a division of my copending application Serial No. 61,029 filed January 27, 1936, and which resulted in Patent No. 2,212,085, dated August 20, 1940.

It is desirable in materials testing machines to have a high degree of sensitivity and accuracy through a wide load range. Various arrangements have heretofore been suggested and used for obtaining such a wide load range by providing multiple load ranges whereby in the lower capacities of the machine relatively large unit spacing is provided on the dial of the load indicating mechanism thereby providing maximum ease in accurately reading the loads whereas in the higher load capacities the unit spacing of the dial graduations is much smaller. By such an arrangement the percentage of error is consistently maintained at a minimum for all load ranges. One of the difficulties with these prior arrangements is the costly mechanism required to produce multiple load ranges so that each range has a high degree of sensitivity and accuracy throughout its full range.

It is an object of my invention to provide an improved multiple load range apparatus that has a high degree of accuracy and sensitivity together with being rugged and relatively economical in construction, operation and maintenance but without sacrificing the precision qualities desirable in load weighing apparatus, especially in the materials testing field.

A further object is to provide a multiple load range apparatus employing in an improved manner a fluid pressure load responsive means adapted so that the mechanical structure of the responsive means remains substantially unchanged even though its load weighing function is subject to change to effect different load ranges.

A further object in this respect is to provide improved means whereby the above load ranges of the responsive means may be effectively changed in a simple, direct and positive manner.

Still another object of my invention is to provide an improved multiple load range weighing and indicating apparatus whereby any desired load weighing range may be conveniently selected and at the same time automatically change the load indicating mechanism so that it corresponds to the selected load range.

In accomplishing the foregoing and other objects of my invention I have provided in one specific aspect thereof a plurality of fluid pressure load responsive elements specifically herein Bourdon tubes, the very end of each tube being actuated by its own spring system and the respective spring systems, in turn, being actuated by a common servo-motor preferably of the air controlled type. The free end of each Bourdon tube has an air jet and baffle associated therewith for controlling the servo-motor and the multiple load ranges are effected in a convenient and simple manner merely by shifting a valve mechanism which automatically connects one or the other of the Bourdon tubes to the load producing apparatus such as the main hydraulic load producing cylinder of a materials testing machine or to the hydraulic support of an Emery materials testing machine such as shown in Emery Patent 1,848,468. The load indicating system is suitably interconnected with the selecting valve means so that the indicating and weighing mechanisms are properly coordinated at all times in accordance with the selected load range.

Aside from providing a very rugged, dependable and accurate multiple load range system, I am also able to accomplish the very desirable result of shifting the load range of the apparatus during the course of a test without interrupting the same. In this manner it is possible to obtain a high degree of accurate reading during the initial low loads of a test and then obtain the same accurate readings when the test load exceeds the capacity of the lower load range.

Other objects and advantages will be more apparent to those skilled in the art from the following description of the accompanying drawing in which:

Fig. 1 is a diagrammatic illustration for obtaining multiple load ranges by employing a plurality of pressure responsive elements arranged for cooperation with a common operating mechanism;

Fig. 2 is a vertical section taken substantially on the line 2—2 of Fig. 1;

Fig. 3 is an enlarged sectional view of a relay valve that may be interposed between the servo-motor and the air jet-baffle control.

In the particular embodiment of the invention such as is disclosed herein merely for the purpose of illustrating certain specific forms among possible others that the invention might take in practice, I have shown a Bourdon tube 210 for low load range operation fixed at one end while its free end carries a baffle 211 for cooperation with a jet 212 and air relay valve 213. A set of springs preferably of the double helical type generally indicated at 214 are connected at their lower ends to the free end of the Bourdon tube while their upper ends are connected to a vertically movable rod 215 guided by a bushing or other suitable means. A servo-motor yoke frame 216 is secured to rod 215 and also to the diaphragm of a servo-motor 217.

A second Bourdon tube 218, for high load range operation, has one of its ends fixed while its free end is provided with a baffle 219 for cooperation with an air jet 220 and air relay valve 221. A set of springs is also provided for resisting movement of the free end of the tube and for purposes of symmetry and compactness the springs are arranged in pairs, 222 and 223, located on each side of spring set 214. The lower ends of the set of springs 222 and 223 are secured to a cross member 224 which is pivotally or otherwise suitably secured to the free end of Bourdon tube 218 while the upper ends of said springs are connected to rod 215 by a cross member 225. Thus both sets of springs and Bourdon tubes are commonly connected to the servo-motor 217.

The inner set of springs 214 and the outer set of springs 222 and 223 will hereinafter be broadly referred to respectively as the low and high load range springs and the Bourdon tubes 210 and 218 will also be respectively referred to as the low and high load range tubes or pressure responsive means.

Both sets of tubes are supplied with fluid, whose pressure is to be measured through pipes 226 and 227, such pressure being supplied, for example, from any suitable materials testing machine not shown herein but one form of which is disclosed in my said parent application. Suitable hand valves 228 and 229 may be selectively closed in accordance with the particular load range to be used. Servo-motor 217 is also selectively connectible to either of the air relay valve controls 213 or 221 by a three-way valve 230, this valve permitting alternative communication between pipes 231 and 232 or between pipes 232 and 233 with valve 230 in the position as shown. The air jet-baffle 219 and 220 and relay valve control 221 are identical to the corresponding control elements 211, 212 and 213 for the second Bourdon tube 210 and hence the description for one set of controls will suffice for the other. The air jet 220 is supplied with air under constant pressure from any suitable source transmitted from a pipe 10 and thence through a pipe 11. Increase of internal pressure in Bourdon tube 218, due to increase of specimen load, causes expansion of the tube and accordingly moves baffle 219 downwardly. However, the most minute downward movement of the baffle 219 away from jet 220 will instantly cause a reduction of pressure in pipe 13. A bellows 14 is connected to pipe 13 by passage 20 so that the internal pressure of bellows 14 will be the same as in pipe 13, which preferably is of minimum volume. The air relay valve 221 is controlled by bellows 14. Thus, a reduction of pressure in pipe 13 will permit contraction of bellows 14, causing a pin 15 and a ball 16 supported thereby to lower and thereby increase the clearance between ball 16 and a ball seat 17. Air is thus admitted from pipe 10, through passages 18 and 19, to pipe 233 and through valve 230 in the position as shown to pipe 232 and servo-motor 217. Servo-motor 217 may be any suitable piston or diaphragm type mounted upon a stationary bracket. Admission of air to motor 217 causes its movable element 27 to move yoke frame 216 or other suitable mechanical connection upwardly and thereby increase the upward force on the free end of the Bourdon tube 218 as through the set of springs 222, 223 connected to the yoke and tube. The upward force transmitted to the free end of Bourdon tube 218 causes baffle 219 to be moved upwardly in the direction of the jet 220 until the baffle again restricts the flow therefrom and thereby increases the pressure in pipe 13. This increases the pressure in bellows 14, expanding it, raising pin 15 and ball 16 toward its seat 17, thus restricting the flow of air from pipe 10 through passage 18 into passage 19. A clearance between a hole 21 and pin 15 provides a small continuous leakage for the escape of air from passage 19 to the atmosphere. Thus, when the flow of air from pipe 10, through passage 18, is restricted by action of ball 16, sufficient air will flow out of passage 19 through the leakage clearance to establish and maintain a balance between the forces tending to expand the tube and the upward force imposed by the servo-motor 217 on the free end of Bourdon tube 218 through yoke frame 216 and springs 222, 223. The free end of the tube is thus restored to its initial position. Conversely, when pressure in the Bourdon tube is reduced, springs 222, 223 will move the free end of the tube and baffle 219 upwardly, thereby restricting flow of air through the jet 220 with consequent increase of pressure in pipe 13. This increase of pressure causes air relay valve 221 to discharge air from motor 217, thus reducing the restoring force on the free end of the Bourdon tube which thereupon expands and accordingly moves baffles 219 downwardly to permit a freer discharge of air through jet 220. Pressure in pipe 13 is thus reduced whereupon the air relay valve functions in the manner previously described to control and hold pressure in restoring motor 217 so that a balance is reached between the forces tending to expand the tube and the restoring force therefor. Hence the free end of the tube and its baffle will have moved only sufficiently to return to their original position. The strength of springs 222, 223 is such that for a given restoring force the frame 216 will have considerable movement compared to the minute movement of the baffle. Preferably the stress-strain relation of this spring is a substantially straight line which can be most effectively obtained by using a pair of well-known double helical springs as shown although it will of course be understood that other types of springs may be adapted to the principles of my invention.

It is found in actual practice that the free end of the tube has only minute movement in response to increments of pressure change therein, and that upon occurrence of such movement the tube is very effectively restored to its original position by the cooperative action of the tube, the air relay control and the servo-motor 217 and springs 222, 223. Hence the free end of the tube has a substantially constant position throughout full increases and decreases of fluid pressure therein with the result that the tube has a substantially straight line relation between variations of pressure therein and the force necessary to hold the free end to virtual fixed position. The servo-motor 217 exerts this force through yoke frame 216 and springs 222, 223 which are preferably chosen to extend in highly accurate straight line relation to its load. Therefore, changes of internal pressure in the Bourdon tube 218 will produce corresponding substantially straight line movements of the end of springs 222, 223 held by yoke frame 216. These springs, however, have a varying relation in which case the indicating dial would be calibrated to compensate for such variations.

Heretofore the free end of the Bourdon tube has been permitted to move progressively in response to progressive changes in pressure therein with the result that movement of the tube when multiplied through a linkage and gearing did not necessarily give a straight line relation with respect to variations of pressure therein. Another difficulty with these prior Bourdon tube arrangements was that the slightest amount of friction or retarding force imposed upon the free movement of the Bourdon tube caused irregular and uncertain operation thereof. In accordance with the principles of my invention, motor 217 develops an extra ordinary amount of power and movement, in response to minute displacements of the Bourdon tube from its balanced position. As a result, motor 217 may operate indicating apparatus through wide ranges of movement, it being understood that the term indicating apparatus broadly refers to recorders as well as to direct reading devices such as a pointer and dial.

To increase the sensitivity of the apparatus, particularly at low ranges, as well as to increase the amount of power available from the servo-motor 217, an initial load spring 29'' is provided so as to exert at all times a substantial downward force against the action of the servo-motor. This requires a high fluid pressure in the servo-motor in order to obtain the normal differential upward force for loading the end of the Bourdon tube as previously described. With a large servo-motor fluid pressure available at all times, the servo-motor is in a condition to unload more and with a greater force for a given movement of the frame 216, and hence handle more friction or extrinsic forces acting in a direction opposing the downward motion of the yoke frame 216. A further advantage derived from the spring 29'' is that the resultant high pressure existing at all times in servo-motor 217 will be more sensitive to action of the air relay valve, this by reason that the rate of discharge through the valve clearance will be very much greater than if the servo-motor pressure were initially low. Hence, the rate of unloading can be made as rapid as the rate of loading which will result in decreased time lag between response of the servo-motor to the action of the jet and baffle. Thus the frictional or operating forces in connection with the indicating apparatus will be overcome in a positive manner without introduction of error. Inasmuch as the baffle does not contact the jet during normal operation, and there are no moving parts, contacts or bearings on the sensitive elements of the apparatus, it is seen that the sensitive elements are not subject to friction.

It will of course be understood that the two sets of load range springs 222, 223 and 214 respectively are of different flexibility in accordance with the load range requirements of each Bourdon tube.

*Operation.*—To render the low load range operative, valve 229 is closed and valve 230 is shifted so as to connect the pipes 231 and 232. This operation also disconnects pipe 233, thus rendering Bourdon tube 218 inoperative. Valve 228 is opened, thus permitting fluid pressure to operate Bourdon tube 210 with consequent operation of air relay valve 213 and servo-motor 217. As the load increases, the servo-motor will move yoke frame 216 upwardly, thus elongating spring 214 to maintain baffle 211 in its balanced position, or conversely for decreases in load. Spring 214 will have a degree of stiffness as required by the low range tube 210, so that the yoke frame 216 will have motion to drive the indicating pointer 35 over the entire graduations on the dial face for the pressure range of the low range tube 210. To obtain a larger load range, valve 228 is closed and valve 229 is opened while valve 230 is moved to connect pipes 232 and 233. This operation also disconnects pipe 231, thereby rendering Bourdon tube 210 inoperative. Bourdon tube 218 and air relay control 221 are thus operative to control servo-motor 217. The yoke frame will now cause the outer springs 222 and 223 to be operative in maintaining baffle 219 in its balanced position. These springs will have a combined stiffness as required by the high range tube 218, so that the yoke frame 216 will have motion to drive the indicating pointer 35 over the entire range of graduations on the dial face for the pressure range of the high range tube 218. The fact that both the high and low load range springs are always connected to the yoke frame does not change the principle of operation above described because the servo-motor 217 will produce enough force to move a sufficient distance against the action of both sets of springs until spring 214 exerts enough force to balance the forces in the Bourdon tube. The fact that the other Bourdon tube may have a spring force imposed thereon will not make any difference because that tube will be inoperative by virtue of valve 229 being closed. When either one of the Bourdon tubes is inoperative their respective baffles 211 or 219 may ultimately abut against their respective jets 212 and 220 and remain in such abutment during increasing force of springs 214 and 222, 223. The structure of the baffles and tubes as well as their connections are sufficiently strong to withstand the maximum force of the springs when either jet and its baffle remain in abutment with each other. The fact that the free end of the tube whose baffle is in abutment with its jet is held against movement due to the foregoing abutting relation will not affect the accuracy or sensitivity of the other Bourdon tube which is in operation for the reason that the power of servo-motor 217 is automatically determined in accordance with whatever force it is required to overcome in maintaining whichever jet and baffle are operative in their normal relation. The ability of the servo-motor 217 to generate sufficient power to overcome extrinsic forces has been fully described hereinbefore.

The foregoing multi-load arrangement also permits a relatively simple means for changing the load range graduation of a dial mechanism. This includes an outer stationary dial 235 having graduations 242 on its face. Openings 236 in this dial permit observation of an adjustable numbered dial 237 located to the rear thereof so that either one of two sets of load value numbers 238 or 238' will show through openings 236 in accordance with the angular position of dial 237. Each set of load values will of course start with a zero reading. To shift dial 237 in accordance with the position of valve 230 any suitable connecting mechanism between the valve and dial 237 may be employed, one such mechanism being diagrammatically indicated as links, levers, and arms 240 and 241.

From the foregoing disclosure, it is seen that I have provided a multi-load range weighing and indicating system in which the mechanical structure thereof remains unchanged even though the multi-load functions are changed and it is also seen that merely by shifting valve 230 and opening or closing valve 228 or 229 as the case may be, one or the other of the load ranges may be rendered operative. This will function particularly advantageously in that it permits the apparatus to be adjusted for a low load range during the initial loading of the specimen and then when the specimen load reaches the limit of the low load ranges the apparatus may be instantly adjusted to the higher load range so that the test may continue uninterruptedly as far as desired. This continuous operation is greatly facilitated by the operation of the multi-load range indicating and dial system which is automatically coordinated with the shifting of the weighing mechanism from one load range to the other. All of these and other advantages are obtained in a structure which is highly rugged and foolproof while still maintaining the desirable accuracy and sensitivity which is so essential in the precision field of materials testing.

It will of course be understood that various changes in details of construction and arrangement of parts may be made by those skilled in the art without departing from the spirit of the invention as set forth in the appended claims.

I claim:

1. In combination, a plurality of fluid pressure responsive elements each provided with its own spring for resisting its movement, said springs being of different flexibility, a servo-motor for straining all of said springs, indicating mechanism operated by said servo-motor, means for controlling said servo-motor by any one of said responsive elements, and means for rendering said servo-motor selectively operable by any one of said responsive elements thereby to effect different load ranges in accordance with the flexibility of said springs.

2. In combination, a plurality of force responsive elements each provided with its own extensible means for resisting movement of said elements, the extensible means for each of said elements having different degrees of extension for a given force applied thereto thereby to provide different load ranges, a servo-motor commonly connected to each of said extensible means, mechanism operated by said servo-motor, means for controlling said servo-motor by any one of said responsive elements, and means for rendering said servo-motor selectively operable by any one of said responsive elements whereby for a given force applied to said servo-motor it has different extents of movement in accordance with the extension of the respective extensible means.

3. In combination, a plurality of force responsive means, a plurality of sets of springs, each force responsive means having one set of said springs connected thereto for resisting movement thereof, said sets of springs having different degrees of flexibility for a given force applied thereto, a multiple load range indicating mechanism having a force indicating member, a servo-motor connected to said springs so as to apply a variable resisting force to the same, means for controlling said servo-motor by any selected one of said force responsive means, means for actuating said indicating member by said servo-motor, and means for selecting a predetermined range of said indicating mechanism and automatically selecting the corresponding pressure responsive means and rendering its set of springs effective in accordance with the selected load range.

4. In combination, a plurality of fluid pressure load responsive elements each provided with its own spring for resisting its movement, said springs being of different flexibility to provide different load ranges, a servo-motor for straining all of said springs, load indicating mechanism operated by said servo-motor, and means including air jets and baffles respectively operated by said fluid pressure responsive elements for controlling said servo-motor in accordance with load pressure variations in said responsive elements, and means whereby said air jets and indicating mechanism which is operated by said servo-motor are rendered selectively operable in accordance with a desired load range.

5. In combination, a plurality of fluid pressure load responsive elements each provided with its own spring for resisting its movement, said springs being of different flexibility to provide different load ranges, an air controlled servo-motor commonly connected to said springs for straining both of the same, means for controlling the air pressure of said servo-motor by said responsive elements, a multi-load indicating mechanism operated by said servo-motor, and means for rendering said servo-motor selectively operable by only one or the other of said responsive elements thereby to effect different load range operations of said indicating mechanism in accordance with the flexibility of said springs.

6. In combination, a plurality of load responsive Bourdon tubes one end of which is fixed and the other end is free, the free ends of both of said tubes moving in one direction in response to increases of pressure and in the opposite direction in response to decreases of pressure in said tubes, a plurality of sets of springs respectively connected to the free ends of said tubes to resist movement thereof, each tube having only one set of springs connected thereto and said springs being of different flexibility to provide different load ranges, a servo-motor for straining said sets of springs, indicating mechanism operated by said servo-motor, means controlling said servo-motor by either of said responsive elements, and means for rendering said servo-motor selectively operable by only one or the other of said responsive elements thereby to effect different load ranges in accordance with the flexibility of said springs.

7. In combination, a plurality of Bourdon tubes the free ends of which move in the same direction in response to increases or decreases of pressure in the tubes, a plurality of sets of springs respectively connected at one of their ends to the free ends of said tubes and their other ends extending in the same direction away from said tubes, each tube having only one set of springs connected thereto, a servo-motor commonly connected to said other ends of the springs for straining the same, said sets of springs being of different flexibility to provide different load ranges, indicating mechanism operated by said servo-motor, means for controlling said servo-motor by either of said Bourdon tubes, and means for rendering said servo-motor selectively operable by only one or the other of said Bourdon tubes thereby to effect different load ranges in accordance with the flexibility of said springs.

8. In combination, a plurality of fluid pressure responsive elements each provided with its own spring for resisting its movement, said springs being of different flexibility to provide different load ranges, an air controlled servo-motor for straining all of said springs, indicating mechanism operated by said servo-motor, means for controlling said servo-motor by either of said responsive elements including a plurality of air pipes, and valve means for selectively connecting said pipes to said servo-motor thereby to render said servo-motor operable by only one or the other of said responsive elements to effect different load ranges in accordance with the flexibility of said springs.

9. In combination, a plurality of fluid pressure responsive elements each provided with its own spring for resisting its movement, said springs being of different flexibility to provide different load ranges, an air controlled servo-motor for straining both of said springs, a multi-load range indicating mechanism operated by said servo-motor, means for controlling said servo-motor by either of said responsive elements including a plurality of air pipes, valve means for selectively connecting said pipes to said servo-motor thereby to render said servo-motor operable by only one or the other of said responsive elements to effect different load ranges in accordance with the flexibility of said springs, and means for changing the load range of said indicating mechanism automatically in accordance with the selecting operation of said valve means.

10. In combination, a plurality of Bourdon tubes having their free ends movable in the same direction in response to increases of load, a plurality of sets of springs of different flexibility respectively connected at their corresponding ends to the free ends of said tubes and the other ends of said springs extending away from the tubes in the same direction, each tube having only one set of springs connected thereto, a frame connected to said other ends of said springs and extending back beyond the spring ends which are connected to said Bourdon tubes, an air controlled servo-motor for moving said frame to vary the force of said springs and thereby control movement of the free ends of said Bourdon tubes, an air jet and baffle associated with the free end of one of said tubes and a similar air jet and baffle associated with the free end of the other of said tubes, means for rendering said air jets and baffles selectively operative to control said servo-motor, and mechanism connected to said frame so as to be operated by the servo-motor and to have a large increment of movement for a given minute increment of movement of the free ends of said Bourdon tubes.

11. In combination, a plurality of Bourdon tubes, means whereby said tubes are operable for different load ranges, a power servo-motor for maintaining the free end of a selected one of said tubes in a substantially constant position throughout load pressure variations therein, means for selectively rendering said tubes operative in accordance with a desired load range, load indicating mechanism, and means for actuating said indicating mechanism by said servo-motor whereby said indicating means is operated in accordance with the load range of the selected tube.

12. In combination, a plurality of Bourdon tubes, means whereby said tubes are operable for different load ranges, a power mechanism common to each of said tubes for maintaining the free end of a selected tube in a relatively constant position during increases and decreases of fluid pressure in said tubes, means for controlling said power mechanism in response to movement of a selected tube whose movement results from varying pressure therein, means for selecting the tube which is to control said power mechanism, and indicating means actuated by said power mechanism whereby the operation of said indicating means is in accordance with the load range of the selected tube.

13. In combination, multiple load weighing means responsive to different load ranges including a plurality of load responsive elements and means for maintaining any selected one of said elements in a substantially constant position throughout application of a force to be weighed thereby, load indicating means operated by said weighing means, and means whereby a weighing and indicating operation may be shifted to one load range by selecting one of said responsive elements or shifted to another load range by selecting another of said responsive elements, or vice versa, all while the load is in the course of being continuously applied to said weighing means thereby allowing a substantially uninterrupted weighing operation through a series of load ranges.

14. In combination, a plurality of load responsive elements, means whereby said responsive elements are operable for different load ranges, a common servo-motor acting on said means, means for controlling said servo-motor in response to changes in load of a selected one of said load responsive elements, means for selecting the responsive element whose load range is desired, and load indicating means operated by said servo-motor so that the indicating means is operated for each load range, said means that are operable for different load ranges having connections with said responsive elements and with said servo-motor so that the movement of said connections is substantially in axial alignment with each other.

15. In combination, a plurality of force responsive elements adapted to have different ranges of operation, power means for resisting movement of said elements, means for selectively controlling said power means by any one of said elements in response to movement thereof, means whereby for a given increment of movement of the selected responsive element the power means has a correspondingly larger increment of movement and mechanism controlled by said power means.

16. In combination, a plurality of force responsive elements adapted to have different ranges of operation, power means common to said elements for resisting movement thereof so as to maintaing a selected one of the same in a substantially constant position, means for selectively controlling said power means by any one of said elements in response to movement thereof, means whereby for a given increment of movement of the selected responsive element the power means has a correspondingly larger increment of movement and mechanism controlled by said servo-motor.

17. In combination, a plurality of fluid pressure responsive elements adapted to have different ranges of operation, a servo-motor common to said elements for resisting movement thereof so as to maintain a selected one of the same in a substantially constant position, means for selectively controlling said servo-motor by any one of said elements in response to movement thereof, and extensible means for connecting said elements to said servo-motor whereby for a given increment of movement of the selected responsive element the power means has a correspondingly larger increment of movement.

18. In combination, a plurality of force responsive elements adapted to have different ranges of operation, a servo-motor common to said elements for resisting movement thereof so as to maintain a selected one of the same in a substantially constant position, means for selectively controlling said servo-motor by any one of said elements in response to movement thereof, and a plurality of springs connected to said elements respectively whereby for a given increment of movement of the selected responsive element the power means has a correspondingly larger increment of movement, said servo-motor acting at all times on all of said springs while under the control of only one of said force responsive elements.

19. In combination, load weighing means including a plurality of load responsive elements adapted for different load ranges, a servo-motor common to each of said responsive elements and mechanically connected thereto at all times to control movement of a selected one of said elements, means for controlling said servo-motor in accordance with the operation of any one of said responsive elements, an indicating means operated by said servo-motor, and means for rendering said servo-motor selectively operable in accordance with the operation of one or the other of said responsive elements while the mechanical connections between all of said elements and said motor are continuously maintained whereby a weighing operation may be shifted from one load range to another while the load is in the course of being continuously applied to said weighing means thereby allowing a substantially uninterrupted weighing operation through a plurality of ranges.

MALCOLM C. TATE.